United States Patent
Ra

(10) Patent No.: US 6,744,429 B2
(45) Date of Patent: Jun. 1, 2004

(54) ABNORMAL OPERATION PREVENTION CIRCUIT FOR DISPLAY DEVICE AND METHOD FOR OPERATING THE SAME

(75) Inventor: Kwang-Hyun Ra, Anyang (KR)

(73) Assignee: Samsung Electronics Co., Ltd., Suwon (KR)

( * ) Notice: Subject to any disclaimer, the term of this patent is extended or adjusted under 35 U.S.C. 154(b) by 239 days.

(21) Appl. No.: 09/942,863

(22) Filed: Aug. 31, 2001

(65) Prior Publication Data

US 2002/0060677 A1 May 23, 2002

(30) Foreign Application Priority Data

Nov. 23, 2000 (KR) .................................... 70085

(51) Int. Cl.7 ................................................. G09G 5/00
(52) U.S. Cl. .................. 345/211; 345/204; 348/377; 315/411
(58) Field of Search .................... 345/60–104, 211, 345/204, 208–210; 348/377, 378; 315/411

(56) References Cited

U.S. PATENT DOCUMENTS 4,011,002 A * 3/1977 Ebihara et al. ............. 340/336
5,563,624 A * 10/1996 Imamura .................... 345/100
5,945,793 A * 8/1999 Park et al. .................. 315/411
6,034,729 A * 3/2000 Lim ............................ 348/377
6,496,168 B1 * 12/2002 Tomida ......................... 345/76

FOREIGN PATENT DOCUMENTS

| JP | 8-304767 | * 11/1996 | |
|----|----------|-----------|--|
| JP | 11-38927 | * 2/1999 | ............ G09G/3/18 |
| JP | 11-271715 | 10/1999 | |

* cited by examiner

Primary Examiner—Lun-Yi Lao
(74) Attorney, Agent, or Firm—McGuireWoods LLP

(57) ABSTRACT

A display device includes a display unit with a plurality of pixels for displaying picture images, a driving unit for controlling operation of the respective pixels of the display unit, a power control unit for supplying a power to the driving unit and the display unit while controlling the power, and an abnormal operation prevention circuit. The abnormal operation prevention unit prevents the pixels from being deteriorated in display characteristics due to interception of an input signal into the driving unit when the power is continuously supplied to the driving unit from the power control unit.

11 Claims, 2 Drawing Sheets

ABNORMAL OPERATION PREVENTION CIRCUIT FOR DISPLAY DEVICE AND METHOD FOR OPERATING THE SAME

BACKGROUND OF THE INVENTION (a) Field of the Invention

The present invention relates to an abnormal operation prevention circuit for a display device and a method for operating the same and, more particularly, to an abnormal operation prevention circuit that prevents pixels of a display element from being deteriorated in display characteristics.

(b) Description of the Related Art

FIG. 1 is a block diagram illustrating the structure of a usual display device.

As shown in FIG. 1, the display device 20 includes a display unit 100 with a plurality of pixels, a driving unit 300 for controlling operation of the respective pixels of the display unit 100, and a power control unit 200 for supplying a power to the display unit 100 and the driving unit 300 while controlling the power. The display unit 100 may be a liquid crystal display, a plasma display panel, or a cathode ray tube.

In case a thin film transistor liquid crystal display (TFT-LCD) is used as the display unit 100, signals Vsync for identifying frames of picture data, signals Hsync for identifying line units, signals DE for identifying data output sections, standard clock signals, and data signals (signals per pixels of red, green and blue) are applied to the display device 20 from a signal source 10 of PC or TV.

The respective signals applied to the display device 20 are processed at the driving unit 300, and transformed into signals for driving the respective pixels in a direct manner. In the TFT-LCD, the signals are applied to the TFTs in the form of a gate driving pulse array and a source driving pulse array. The power control unit 200 generates gate driving voltages, common voltages or gray scale voltages, and supplies the voltages to the relevant units.

In the normal operation of the display device, the pixels do not bear problems such as degradation in display characteristics and image sticking. However, in case the input signals of DE, Vsync or Hsync are intercepted under the continuous supply of power from the power control unit (referred to hereinafter simply as the "abnormal operation"), such problems become serious.

In such an abnormal operation, the output voltage from the driving unit is not controlled so that gate or source driving voltages may be applied to the pixels for a long time, or extremely high voltages may be applied thereto. Consequently, ion impurities in the liquid crystal within the pixel area tend to be absorbed into a polyimide film while making abnormal electric potential charge, and this causes image sticking.

Other display devices such as a plasma display panel and a cathode ray tube also involve the same problems. Therefore, it is a critical factor in improving the performance characteristics of the display device to prevent such an abnormal operation. For instance, in a cathode ray tube, phosphors may be deteriorated due to landing of electron beams for a long period of time. In a plasma display panel, such light emission elements may be deteriorated due to plasma discharge within a cell for a long period of time.

In this respect, a pixel protection circuit is used to identify whether the signal of Vsync or Hsync from the signal source is intercepted, and if necessary, to stop the supply of power or to replace such a signal with another control signal within the driving unit. Such a protection circuit currently available is made as ASIC, and attached to the display device, or incorporated into a control IC of the driving unit. This makes it necessary to re-design other relevant control circuits, resulting in increased production cost.

SUMMARY OF THE INVENTION

It is an object of the present invention to provide a display device which has a circuit for preventing the abnormal operation in a simplified manner.

This and other objects may be achieved by a display device with the following features.

The display device includes a display unit with a plurality of pixels for displaying picture images, a driving unit for controlling operation of the respective pixels of the display unit, a power control unit for supplying a power to the driving unit and the display unit while controlling the power, and an abnormal operation prevention circuit for preventing the pixels from being deteriorated in display characteristics due to interception of an input signal into the driving unit when the power is continuously supplied to the driving unit from the power control unit.

The abnormal operation prevention unit includes a signal sampling unit connected to an input terminal of the driving unit to receive the input signal into the driving unit in parallel without incurring variation in the input signal, a filtering unit connected to an output terminal of the signal sampling unit to receive the output signal from the signal sampling unit, and a transmission unit connected to an output terminal of the filtering unit to receive the output signal from the filtering unit. The filtering unit filters high frequency portions of the received signal by way of a predetermined constant number to output the signal portions of a predetermined pulse width or more to a transmission unit while intercepting the signal portions of less than the predetermined pulse width. The transmission unit transforms the received signal into an input signal for intercepting power supply from the power control unit or intercepting application of an abnormal signal to the pixels from the driving unit.

The signal sampling unit is provided with a circuit for reverse-turning the input signal into the driving unit.

The filtering unit is formed with a passive and/or active filter having one or more resistors and one or more capacitors. The filter filters high frequency portions of the received signal by way of a predetermined constant number to output the signal portions of a predetermined pulse width or more while intercepting the signal portions of less than the predetermined pulse width.

The transmission unit may be provided with a circuit for reverse-turning the output signal from the filtering unit in case a reverse-turned pulse signal is used as the input signal for intercepting power supply from the power control unit or intercepting application of an abnormal signal to the pixels from the driving unit.

In a method for preventing abnormal operation of the display device, the abnormal operation prevention circuit first receives the input signal into the driving unit in parallel without incurring variation in the input signal at the abnormal operation prevention circuit. Second, high frequency portions of the received signal are filtered by way of a predetermined constant number to output the signal portions of a predetermined pulse width or more while intercepting the signal portions of less than the predetermined pulse width. Third, the filtered output signal is transformed into an input signal for intercepting power supply from the power control unit or intercepting application of an abnormal signal to the pixels from the driving unit.

The input signal into the driving unit is reverse-turned at the first step.

The output signal at the second step may be reverse-turned at the third step in case a reverse-turned pulse signal is used as the input signal for intercepting power supply from the power control unit or intercepting application of an abnormal signal to the pixels from the driving unit.

The display unit may be a liquid crystal display, a plasma display panel, or a cathode ray tube.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein.

DETAILED DESCRIPTION OF THE PREFERRED EMBODIMENTS

Preferred embodiments of this invention will be explained with reference to the accompanying drawings.

Figure 1:
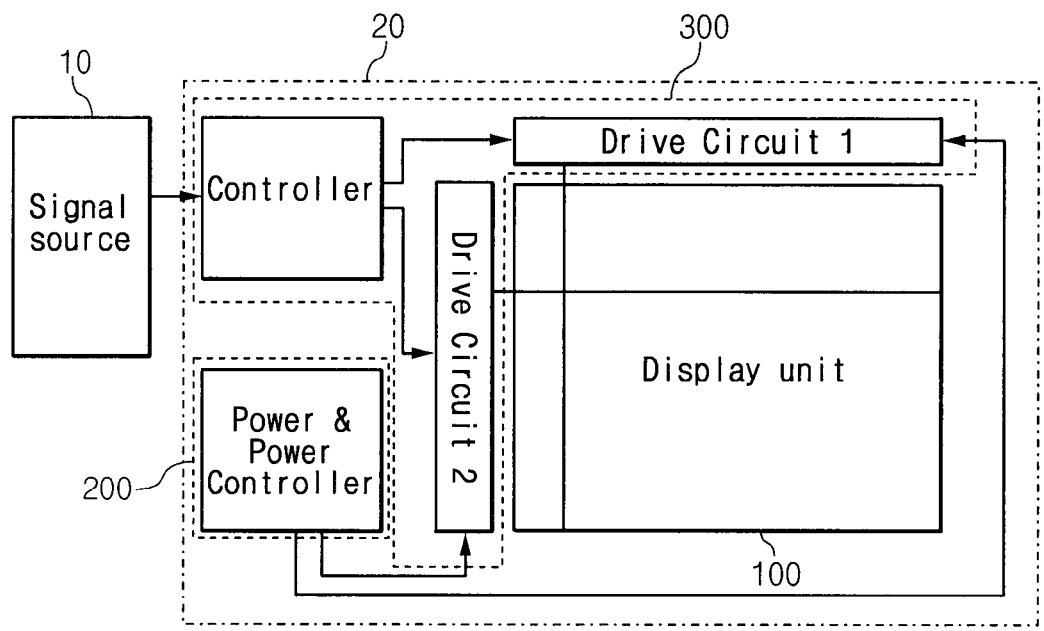
FIG. 1 is a block diagram illustrating the structure of a usual display device.
Figure 2:
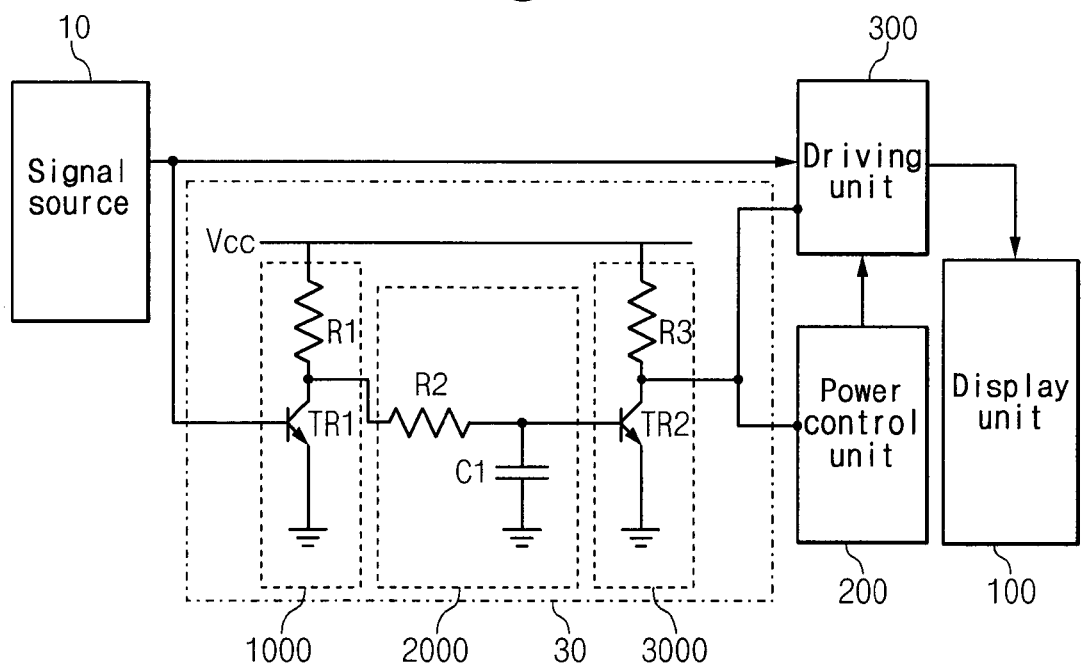
FIG. 2 is a block diagram of a display device according to a preferred embodiment of the present invention.

FIG. 2 is a block diagram of a display device according to a preferred embodiment of the present invention.

As shown in FIG. 2, the display device includes a display unit 100 with a plurality of pixels for displaying picture images, a driving unit 300 for controlling operation of the respective pixels of the display unit 100, and a power control unit 200 for supplying a power to the display unit 100 and the driving unit 300 while controlling the power, and an abnormal operation prevention circuit 30 for preventing the pixels from being deteriorated in display characteristics due to interception of an input signal into the driving unit 300 from a signal source 10 when the power is continuously supplied to the driving unit 300 from the power control unit 200.

The abnormal operation prevention unit 30 includes a signal sampling unit 1000 connected to an input terminal of the driving unit 300 to receive the input signal into the driving unit 300 in parallel without incurring variation in the input signal, a filtering unit 2000 connected to an output terminal of the signal sampling unit 1000 to receive the output signal from the signal sampling unit 1000, and a transmission unit 3000 connected to an output terminal of the filtering unit 2000 to receive the output signal from the filtering unit.

The filtering unit 2000 filters high frequency portions of the received signal by way of a predetermined constant number to output the signal portions of a predetermined pulse width or more to the transmission unit 3000 while intercepting the signal portions of less than the predetermined pulse width. The transmission unit 3000 transforms the received signal into an input signal for intercepting power supply from the power control unit 200 or intercepting application of an abnormal signal to the pixels from the driving unit 300.

Figure 3:
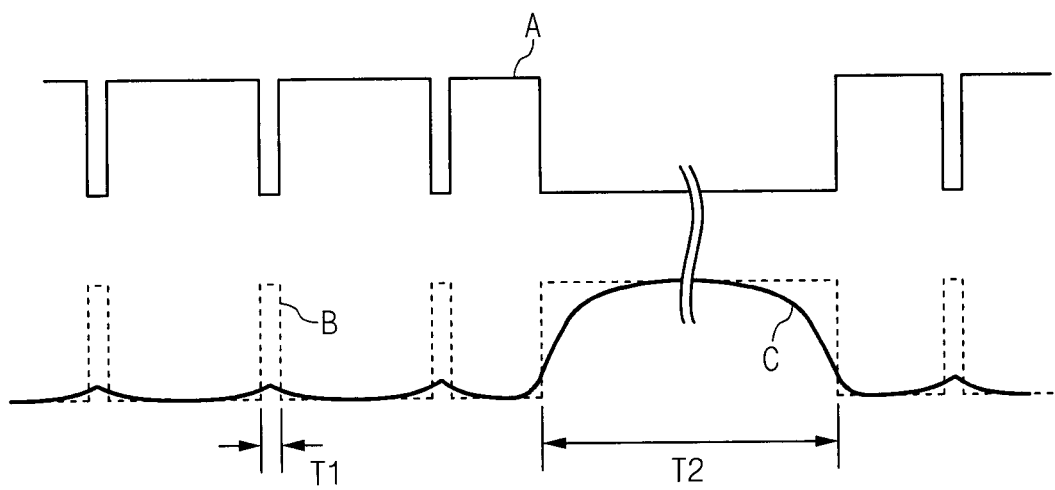
FIG. 3 illustrates waveform charts attributed to respective operation units of the display device shown in FIG. 2.

FIG. 3 illustrates waveform charts attributed to the respective operation units.

In the case of a DE signal, the DE signal applied to the signal sampling unit 1000 has a waveform A shown in FIG. 3. In case the DE signal is standing in a level of high, it is representative of the state where data are input into the driving unit 300, and called the "positive DE".

As shown in FIG. 3, a portion T1 standing in a level of low with a predetermined distance is existent between data input sections. In case the DE signal is intercepted, another portion T2 standing in the level of low with a significantly longer width than the normal pulse width becomes to be existent.

As shown in FIG. 2, the signal sampling unit 1000 receives the input DE signal into the driving unit 300 in parallel, and fetches it without recurring variance in the DE signal. In order to reverse-turn the positive DE signal, the signal sampling unit 1000 is provided with an inverter having a first resistor R1 and a first transistor TR1.

The reverse-turned positive DE signal has a waveform B shown in FIG. 3. In case the DE signal is a negative DE, one inverter may be further added to the signal sampling unit 1000 to obtain the B waveform.

The signal with the B waveform is input into the filtering unit 2000. The filtering unit 2000 is provided with a second resistor R2 and a first capacitor C1.

The filtering unit 2000 is formed with a low band passage filter. The low band passage filter has a constant number depending upon the values of the resistor and the capacitor such that it can filter high frequency signal portions. The pulse T1 with a relatively narrow width contains many high frequency portions so that it cannot pass the filtering unit 2000.

By contrast, the pulse T2 with a relatively large width passes the filtering unit 2000 so that the output signal of the filtering unit 2000 has a waveform C shown in FIG. 3.

The DE signal with the C waveform from the filtering unit 2000 is input into the transmission unit 3000. Upon receipt of such a DE signal, the transmission unit 3000 transforms the signal into an input signal for intercepting power supply from the power control unit 200 or intercepting application of an abnormal signal to the pixels from the driving unit 300. As shown in FIG. 2, the transmission unit 3000 may be provided with an inverter having a third resistor R3 and a second transistor TR2 if the input signal is in the form of a reverse-turned pulse.

Alternatively, the inverter for the signal sampling unit 1000 may be replaced with a CMOS inverter, and the filtering unit 2000 may be formed with an active filter based on an OP Amp, or a multi-stepped low band passage filter.

The display device 30 may be a liquid crystal display, a plasma display panel, or a cathode ray tube.

As described above, when the signal of Vsync, Hsync or DE from a signal source is abnormally intercepted, the abnormal operation prevention unit makes it possible to intercept the power supply from the power control unit or prevent the application of an abnormal signal to the pixels from the driving unit. In this way, the pixels are prevented from being deteriorated in display characteristics.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A display device, comprising:
   a display unit with a plurality of pixels for displaying picture images;
   a driving unit for controlling operation of the respective pixels of the display unit;
   a power control unit for supplying a power to the driving unit and the display unit while controlling the power; and
   an abnormal operation prevention circuit respectively connected to the power control unit and the driving unit for preventing the pixels from being deteriorated in display characteristics,
   wherein the abnormal operation prevention unit comprises:
      a signal receiving unit connected to an input terminal of the driving unit to receive the input signal into the driving unit in parallel;
      a filtering unit connected to an output terminal of the signal receiving unit to receive the output signal from the signal receiving unit, the filtering unit filtering high frequency portions of the received signal by way of a predetermined constant number to output the signal portions of a predetermined pulse width or more to a transmission unit while intercepting the signal portions of less than the predetermined pulse width; and
      a transmission unit connected to an output terminal of the filtering unit to receive the output signal from the filtering unit, the transmission unit transforming the received signal into an input signal for intercepting power supply from the power control unit or intercepting the driving unit from applying an abnormal signal to the pixels.

2. The display device of claim 1, wherein the signal receiving unit comprises a circuit for reverse-turning the input signal into the driving unit.

3. The display device of claim 1, wherein the filtering unit is formed with a passive and/or active filter having one or more resistors and one or more capacitors, the filter filtering high frequency portions of the received signal by way of a predetermined constant number to output the signal portions of a predetermined pulse width or more while intercepting the signal portions of less than the predetermined pulse width.

4. The display device of claim 1, wherein the transmission unit comprises a circuit for reverse-turning the output signal from the filtering unit in case a reverse-turned pulse signal is used as the input signal for intercepting power supply from the power control unit or intercepting the driving unit from applying an abnormal signal to the pixels.

5. An abnormal operation prevention unit for a display device, the display device comprising a display unit with a plurality of pixels for displaying picture images, a driving unit for controlling the respective pixels of the display unit, and a power control unit for supplying a power to the driving unit and the display unit while controlling the power, the abnormal operation prevention unit comprising:
   a signal receiving unit connected to an input terminal of the driving unit to receive the input signal into the driving unit in parallel;
   a filtering unit connected to an output terminal of the signal receiving unit to receive an output signal from the signal receiving unit, the filtering unit filtering high frequency portions of the received signal by way of a predetermined constant number to output the signal portions of a predetermined pulse width or more while intercepting the signal portions of less than the predetermined pulse width; and
   a transmission unit connected to an output terminal of the filtering unit to receive the output signal from the filtering unit, the transmission unit transforming the received signal into an input signal for intercepting power supply from the power control unit or intercepting the driving unit from applying an abnormal signal to the pixels.

6. The abnormal operation prevention unit of claim 5, wherein the signal receiving unit comprises a circuit for reverse-turning the input signal into the driving unit.

7. The abnormal operation prevention unit of claim 5, wherein the filtering unit is formed with a passive or/and active filter having one or more resistors, and one or more capacitors, the filter filtering high frequency portions of the received signal by way of a predetermined constant number to output the signal portions of a predetermined pulse width or more while intercepting the signal portions of less than the predetermined pulse width.

8. The abnormal operation prevention unit of claim 5, wherein the transmission unit comprises a circuit for reverse-turning the output signal from the filtering unit in case a reverse-turned pulse signal is used as the input signal for intercepting power supply from the power control unit or intercepting the driving unit from applying an abnormal signal to the pixels.

9. A method for preventing abnormal operation of a display device, the display device comprising a display unit with a plurality of pixels for displaying picture images, a driving unit for controlling the respective pixels of the display unit, a power control unit for supplying a power to the driving unit and the display unit while controlling the power, and an abnormal operation prevention circuit for preventing the pixels from being deteriorated in display characteristics the method comprising the steps of:
   (a) receiving the input signal into the driving unit in parallel without incurring variation in the input signal at the abnormal operation prevention circuit;
   (b) filtering high frequency portions of the received signal by way of a predetermined constant number to output the signal portions of a predetermined pulse width or more while intercepting the signal portions of less than the predetermined pulse width; and
   (c) receiving the output signal at the (b) step, and transforming the received signal into an input signal for intercepting power supply from the power control unit or intercepting the driving unit from applying an abnormal signal to the pixels.

10. The method of claim 9, wherein the input signal into the driving unit is reverse-turned at the (a) step.

11. The method of claim 9, wherein the output signal at the (b) step is reverse-turned at the (c) step in case a reverse-turned pulse signal is used as the input signal for intercepting power supply from the power control unit or intercepting the driving unit from applying an abnormal signal to the pixels from the driving unit.

* * * * *